(12) United States Patent
Lassini et al.

(10) Patent No.: US 11,966,223 B2
(45) Date of Patent: *Apr. 23, 2024

(54) AUTOPILOT CONTROL SYSTEM FOR UNMANNED VEHICLES

(71) Applicant: GE Aviation Systems LLC, Grand Rapids, MI (US)

(72) Inventors: Stefano Angelo Mario Lassini, Lowell, MI (US); Ryan Daniel Gorby, Howard City, MI (US); John Andrew Ingersoll, Byron Center, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/468,847

(22) Filed: Sep. 8, 2021

(65) Prior Publication Data

US 2022/0107638 A1 Apr. 7, 2022

Related U.S. Application Data

(62) Division of application No. 15/875,454, filed on Jan. 19, 2018, now Pat. No. 11,131,991.

(51) Int. Cl.
*G05D 1/00* (2006.01)
*B64C 39/02* (2023.01)
*G08G 5/00* (2006.01)

(52) U.S. Cl.
CPC ......... *G05D 1/0088* (2013.01); *B64C 39/024* (2013.01); *G05D 1/0011* (2013.01);
(Continued)

(58) Field of Classification Search
CPC .. G05D 1/0088; G05D 1/0011; G05D 1/0077; B64C 29/024; B64C 2201/145; B64C 2201/146
(Continued)

(56) References Cited

U.S. PATENT DOCUMENTS 7,777,155 B2 8/2010 Twelves, Jr. et al.
8,004,855 B2 8/2011 Salama et al.
(Continued)

FOREIGN PATENT DOCUMENTS

CN 101419461 A 4/2009
CN 101515178 A 8/2009
(Continued)

OTHER PUBLICATIONS

Mafie, Farhad, "Electronic Products: Flash vs. SRAM Based FPGAs", Mar. 25, 2014, <https://www.electronicproducts.com/comparing-flash-and-sram-based-fpgas/> (Year: 2014).*
(Continued)

*Primary Examiner* — Krishnan Ramesh
(74) *Attorney, Agent, or Firm* — Dority & Manning, P.A.

(57) ABSTRACT

A control system an unmanned vehicle includes a first processing unit configured to execute a primary autopilot process for controlling the unmanned vehicle. The control system further includes a programmable logic array in operative communication with the first processing unit. The control system also includes a state machine configured in the programmable logic array. The state machine is configured to enable control of the unmanned vehicle according to a backup autopilot process in response to an invalid output of the first processing unit.

10 Claims, 11 Drawing Sheets

(52) U.S. Cl.
CPC ......... *G05D 1/0061* (2013.01); *G05D 1/0077* (2013.01); *G08G 5/0069* (2013.01); *B64U 2201/104* (2023.01); *B64U 2201/20* (2023.01)

(58) Field of Classification Search
USPC ......................................................... 701/11
See application file for complete search history.

(56) References Cited

U.S. PATENT DOCUMENTS

| | | |
|---|---|---|
| 9,817,396 B1 | 11/2017 | Takayama et al. |
| 10,501,178 B2 | 12/2019 | Knapp et al. |
| 10,942,509 B2 | 3/2021 | Lassini et al. |
| 2003/0130770 A1* | 7/2003 | Matos ................ B64D 45/0031 701/3 |
| 2004/0003741 A1 | 1/2004 | Iskra et al. |
| 2007/0247319 A1 | 10/2007 | Oelrich et al. |
| 2008/0123552 A1 | 5/2008 | Slaton |
| 2008/0215204 A1* | 9/2008 | Roy ...................... G05D 1/0044 701/28 |
| 2011/0248121 A1* | 10/2011 | Hirvonen .............. B64C 13/505 244/194 |
| 2012/0022719 A1 | 1/2012 | Matos |
| 2014/0088800 A1* | 3/2014 | Mercer ..................... G01P 5/00 701/14 |
| 2015/0041104 A1 | 2/2015 | De Bock et al. |
| 2015/0068703 A1 | 3/2015 | de Bock et al. |
| 2015/0274293 A1* | 10/2015 | Heusinger ............... B64C 15/00 701/36 |
| 2015/0347872 A1* | 12/2015 | Taylor ................... G06F 18/254 382/224 |
| 2015/0353192 A1* | 12/2015 | Morrison ............... B64D 31/06 244/17.23 |
| 2016/0321148 A1 | 11/2016 | Lassini et al. |
| 2016/0334792 A1* | 11/2016 | Jopling ................ G05D 1/0206 |
| 2017/0106986 A1* | 4/2017 | Sweeny ................. B64D 45/00 |
| 2017/0285627 A1 | 10/2017 | Feldmann et al. |
| 2017/0308078 A1 | 10/2017 | Heinonen et al. |
| 2017/0334134 A1 | 11/2017 | Herzog |
| 2019/0009334 A1 | 1/2019 | Effernelli et al. |
| 2019/0043001 A1* | 2/2019 | Woulfe ............. G01C 21/3438 |
| 2019/0189016 A1* | 6/2019 | Kubie ..................... G05D 1/104 |
| 2019/0227826 A1 | 7/2019 | Taylor et al. |
| 2019/0228666 A1 | 7/2019 | Lassini |
| 2019/0230793 A1 | 7/2019 | Lassini |
| 2019/0230800 A1 | 7/2019 | Neuman et al. |
| 2019/0230801 A1 | 7/2019 | Neuman et al. |
| 2019/0230822 A1 | 7/2019 | Neuman et al. |
| 2019/0378423 A1* | 12/2019 | Bachrach .............. G06T 19/003 |

FOREIGN PATENT DOCUMENTS

| | | |
|---|---|---|
| CN | 101833336 A | 9/2010 |
| CN | 102915038 A | 2/2013 |
| CN | 105786620 A | 7/2016 |
| CN | 106483962 A | 3/2017 |
| CN | 107145160 A | 9/2017 |
| DE | 102012002955 A1 | 8/2013 |
| DE | 102014016718 A1 | 5/2015 |
| EP | 1704989 A2 | 9/2006 |
| EP | 1961514 A2 | 8/2008 |
| JP | 2006335312 A | 12/2006 |
| WO | WO2017/109395 A1 | 6/2017 |

OTHER PUBLICATIONS

1-CORE Technologies, FPGA Architectures Overview, Downloaded Jan. 3, 2018, https://www.pdx.edu/nanogroup/sites/www.pdx.edu.nanogroup/files/FPGA-architecture.pdf, 2 pages.

Dade, Deliverable 1 Report, UAV Outback Challenge 2012 Search and Rescue Challenge, Oct. 4, 2012, pp. 1-6.

Loewen, MP2128 3X MicroPilot's Triple Redundant UAV Autopilot, Sep. 30, 2010, pp. 1-10. https://www.micropilot.com/pdf/white-papers/mp21283x.pdf.

Microsemi, Power Matters, AC400 Application Note, SmartFusion2 SoC FPGA Flash*Freeze Entry and Exit-Libero SoC v11.8, 23 pages.

Microsemi, Power Matters, FPGA and SoC Product Catalog, Lowest Power, Proven Security, and Exceptional Reliability, 28 pages.

Microsemi, Power Matters, Microcontroller Based FPGA's Hit the Mark, WP0205 White Paper, Jan. 2016, 6 pages.

Vanderleest, MPSoC Hypervisor: The Safe & Secure Future of Avionics, DornerWorks, Embedded Systems Engineering, DASC 2015, Prague, 25 pages.

Vectornav Technologies, Embedded Navigation Solutions, Industrial Series, 2017, 6 pages.

Xilinx, Xynq UltraScale+ MPSoC Product Tables and Product Selection Guide, 2016-2017, 16 pages.

Zhang et al., Dual Redundant Flight Control System Design for Microminiature UAV, Proceedings of the $2^{nd}$ International Conference on Electrical, Computer Engineering and Electronics, Paris France, Jun. 30, 2015, pp. 785-791.

Vivekanandan et al., "A Simplex Architecture for Intelligent and Safe Unmanned Aerial Vehicles", 2016 IEEE $22^{nd}$ International Conference On Embedded And Real-Time Computing Systems And Applications, IEEE, Aug. 17, 2016, pp. 69-75.

\* cited by examiner

AUTOPILOT CONTROL SYSTEM FOR UNMANNED VEHICLES

CROSS-REFERENCE TO RELATED APPLICATIONS

This application is a divisional application of U.S. patent application Ser. No. 15/875,454 filed Jan. 19, 2018, the contents of which are hereby incorporated by reference in their entirety.

FIELD

The present disclosure relates generally to unmanned aerial vehicles, and more particularly to control systems for unmanned aerial vehicles.

BACKGROUND

An unmanned vehicle (UV) is a vehicle having no onboard pilot. Typically, (UVs) such as unmanned aerial vehicles (UAVs) are controlled remotely by a pilot, by onboard control systems, or by a combination of a remote pilot and onboard control system. Most unmanned aerial vehicles include a control system to control vehicle operations. Often, a control system for a UAV includes one or more vehicle control systems including onboard navigation systems such as inertial navigation systems and satellite navigation systems. Unmanned aerial vehicles may use inertial navigation sensors such as accelerometers and gyroscopes for flight positioning and maneuvering and satellite-based navigation for general positioning and wayfinding. Most control systems additionally include one or more mission control systems for performing one or more mission control functions, such as capturing images or delivering a payload. Typically, individual hardware components are provided onboard a UAV for each vehicle control system and each mission control system.

BRIEF DESCRIPTION

Aspects and advantages of the disclosed technology will be set forth in part in the following description, or may be obvious from the description, or may be learned through practice of the disclosure.

In an example embodiment, a control system an unmanned vehicle comprises a first processing unit configured to execute a primary autopilot process for controlling the unmanned vehicle. The control system further comprises a programmable logic array in operative communication with the first processing unit. In addition, the control system comprises a state machine configured in the programmable logic array. The state machine is configured to enable control of the unmanned vehicle according to a backup autopilot process in response to an invalid output of the first processing unit.

In another example embodiment, a system-on-module for controlling an unmanned aerial vehicle comprises a first processing system including a first processing unit and a first programmable gate logic array. The first processing unit is configured to execute a primary autopilot process for controlling the UAV. The first processing unit is further configured to provide an output based on the primary autopilot process. The system-on-module further comprises a second processing system including a second processing unit and a second programmable logic array. More specifically, the second programmable logic array is configured to enable control of the UAV based on the primary autopilot process in response to a valid output of the first processing system. The second programmable logic array is further configured to enable control of the UAV based on a backup autopilot process in response to an invalid output of the first processing system.

In yet another example embodiment, a method for controlling an unmanned vehicle comprises monitoring, by a state machine configured in a programmable logic array, a first output associated with a primary autopilot process executing in a first processing system. In response to receiving the first output, the method comprises providing, by the state machine, a second output to control the unmanned vehicle according to the primary autopilot process. The method further comprises detecting, by the state machine, a signal loss associated with the first output. In response to detecting the signal loss, the method further comprises providing, by the state machine, the second output to control the unmanned vehicle according to a backup autopilot process executing in a second processing system.

These and other features, aspects and advantages of the disclosed technology will become better understood with reference to the following description and appended claims. The accompanying drawings, which are incorporated in and constitute a part of this specification, illustrate embodiments of the disclosed technology and, together with the description, serve to explain the principles of the disclosed technology.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
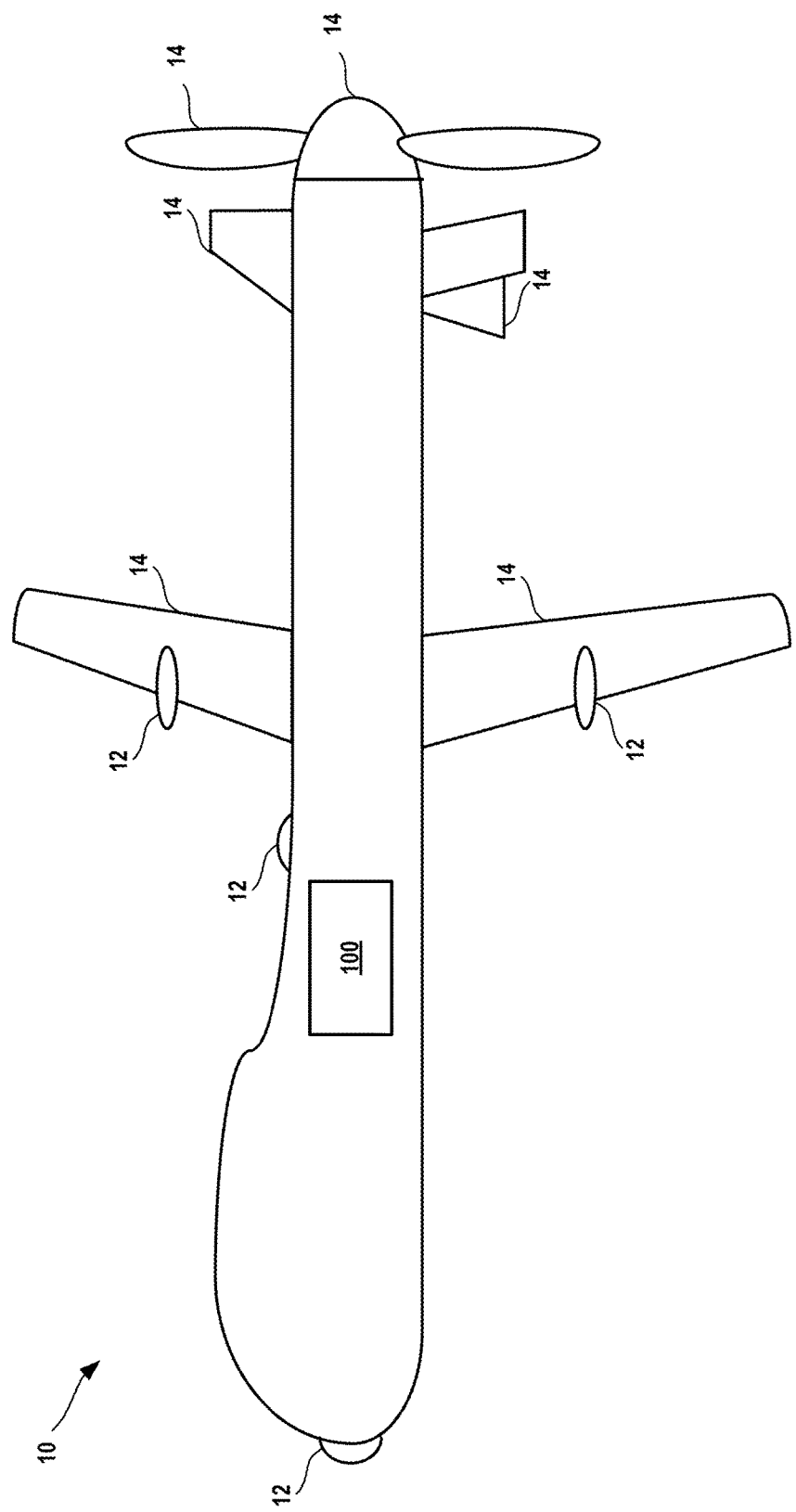
FIG. 1 is a block diagram depicting an example of an unmanned aerial vehicle (UAV) in which embodiments of the present disclosure may be practiced.

Reference now will be made in detail to embodiments of the disclosure, one or more examples of which are illustrated in the drawings. Each example is provided by way of explanation, not limitation of the disclosed embodiments. In fact, it will be apparent to those skilled in the art that various modifications and variations can be made in the present disclosure without departing from the scope or spirit of the claims. For instance, features illustrated or described as part of example embodiments can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to systems and methods for controlling unmanned aerial vehicles (UAV), and more particularly, to systems and methods for controlling unmanned aerial vehicles and vehicle devices of the unmanned aerial vehicles using a control system. In example embodiments, the control system may include one or more processing systems. For example, a control board including a processing system having a first processing unit and a second processing unit may be provided. The processing system may additionally include a programmable logic array such as a field programmable gate array (FPGA) in order to provide a reliable, configurable, and certifiable software configuration suitable to the operating needs of a UAV.

In accordance with example embodiments of the present disclosure, the control system can include a first processing unit configured to execute a primary autopilot process for controlling the UAV without assistance from a human operator. The control system may include a programmable logic array in operative communication with the first processing unit. In addition, the control system may include a state machine configured in the programmable logic array. The state machine may be configured to monitor one or more signals associated with an output of the primary autopilot process. In this manner, the state machine can detect an invalid output of the primary autopilot process. Additionally, the state machine can be configured to enable control of the UAV according to a backup autopilot process in response to the invalid output. In this manner, the ability to switch between the primary autopilot process and the backup autopilot process prevents loss of the UAV when the primary autopilot process is compromised.

In example embodiments, the state machine may be further configured to monitor an output of a remote device that may be used to control operation of the UAV via user-manipulation of one or more input devices on the remote device. For instance, the state machine may receive a first signal and a second signal. The first signal may be associated with the output of the primary autopilot process. The second signal may be associated with the output of the remote device.

Based on the first and second signals, the state machine may determine whether the UAV should be controlled by the primary autopilot process, the backup autopilot process, or the remote device. As an example, the state machine may enable control of the UAV by the primary autopilot process or the backup autopilot process when the second signal indicates a user selection to control the UAV without assistance from a human operator. More specifically, if the first signal indicates the output of the primary autopilot process is valid output, then the state machine enables control of the UAV by the primary autopilot process. Otherwise, the state machine enables control of the UAV by the backup autopilot process.

In some examples, the second signal may not indicate a user-selection to control the UAV without assistance from a human operator. Additionally, the second signal may be lost or unable to be decoded. In such examples, the state machine enables control of the UAV by the remote device. In this manner, the user can manually control operation of the UAV via user-manipulation of one or more input devices on the remote device. However, if, for some reason, the state machine stops receiving the second signal, the state machine is configured to enable control of the UAV by the backup autopilot process. In this manner, the UAV can continue to operate despite the signal loss.

In example embodiments, the control system includes a multiplexer configured in the programmable logic array. More specifically, the multiplexer may be configured to receive a plurality of first servo commands associated with the output of the primary autopilot process, a plurality of second servo commands associated with the output of the backup autopilot process, and a plurality of third servo commands associated with the output of the remote device. In addition, the multiplexer may receive an output provided by the state machine. In some examples, the output provided by the state machine directs the multiplexer to select the plurality of first servo commands, the plurality of second servo commands, or the plurality of third servo commands as an output the multiplexer provides to one or more servos configured to control one or more control surfaces (e.g., actuators) of the UAV. In this manner, the control system of the present disclosure provides improved availability of the autopilot process.

Embodiments of the disclosed technology provide a number of technical benefits and advantages, particularly in the area of unmanned aerial vehicles. As one example, the technology described herein enables control of an unmanned aerial vehicle (UAV) using compact and lightweight electronic solutions. Circuit boards having integrated processing systems enable reduced hardware implementations that provide multiple vehicle control processes and mission control processes for a UAV. Additionally, such solutions provide backup functions and multiple fail point implementations that can meet the high certification requirements of airborne applications. Moreover, the integration of such processing systems into a housing with one or more circuit boards that provide input/output (I/O) interfaces further enables reduced space and weight requirements.

Embodiments of the disclosed technology also provide a number of technical benefits and advantages in the area of computing technology. For example, the disclosed system can provide diverse computing environments to meet the various demands of UAV applications. Multiple processing units spread across multiple integrated circuits provide a range of high speed processing options for application integration. Vehicle and mission control processes can be allocated to various hardware and/or software partitions according to criticality and performance needs. Moreover, embedded field programmable gate arrays tightly coupled to these processing units via integration on a single integrated circuit with corresponding processing units provides additional diversity.

The disclosed system provides a lightweight, verifiable solution with redundancy to enable operation of the autopilot system. A unique solution provided in a single control box with primary and backup autopilot systems may meet the certification requirements of UAVs by various authorities. Moreover, by providing the system in a heterogeneous operating environment, improved availability of one or more control systems of the UAV may be achieved. For example, by providing a primary autopilot system in a processing unit with high-processing capabilities, a robust and effective autopilot system may be provided. Still further, by providing a backup autopilot system in a flash-based FPGA, for example, the backup autopilot system may be enabled with minimal delay. This backup autopilot system is desirable in situations where the primary autopilot becomes compromised.

FIG. 1 is a schematic view of an example unmanned aerial vehicle (UAV) UAV 10. UAV 10 is a vehicle capable of flight without an onboard pilot. For example, and without limitation, UAV 10 may be a fixed wing aircraft, a tilt-rotor aircraft, a helicopter, a multirotor drone aircraft such as a quadcopter, a blimp, a dirigible, or other aircraft.

UAV 10 includes a plurality of vehicle devices including at least one propulsion and movement (PM) device 10. A PM device 14 produces a controlled force and/or maintains or changes a position, orientation, or location of UAV 10. A PM device 14 may be a thrust device or a control surface. A thrust device is a device that provides propulsion or thrust to UAV 10. For example, and without limitation, a thrust device may be a motor driven propeller, jet engine, or other source of propulsion. A control surface is a controllable surface or other device that provides a force due to deflection of an air stream passing over the control surface. For example, and without limitation, a control surface may be an elevator, rudder, aileron, spoiler, flap, slat, air brake, or trim device. Various actuators, servo motors, and other devices may be used to manipulate a control surface. PM device 14 may also be a mechanism configured to change a pitch angle of a propeller or rotor blade or a mechanism configured to change a tilt angle of a rotor blade.

UAV 10 may be controlled by systems described herein including, without limitation, an onboard control system including a control box 100, a ground control station (not shown in FIG. 1), and at least one PM device 14. UAV 10 may be controlled by, for example, and without limitation, real-time commands received by UAV 10 from the ground control station, a set of pre-programmed instructions received by UAV 10 from the ground control station, a set of instructions and/or programming stored in the onboard control system, or a combination of these controls.

Real-time commands can control at least one PM device 14. For example, and without limitation, real-time commands include instructions that, when executed by the onboard control system, cause a throttle adjustment, flap adjustment, aileron adjustment, rudder adjustment, or other control surface or thrust device adjustment.

In some embodiments, real-time commands can further control additional vehicle devices of UAV 10, such as one or more secondary devices 12. A secondary device 12 is an electric or electronic device configured to perform one or more secondary functions to direct propulsion or movement of the UAV. Secondary devices may be related to propulsion or movement of the UAV, but typically provide one or more vehicle or mission functions independent of direct control of vehicle propulsion or motion control. For example, secondary devices may include mission-related devices such as cameras or other sensors used for object detection and tracking. Other examples of secondary devices 12 may include sensors such as LIDAR/SONAR/RADAR sensors, GPS sensors, communication devices, navigation devices, and various payload delivery systems. For example, and without limitation, real-time commands include instructions that when executed by the onboard control system cause a camera to capture an image, a communications system to transmit data, or a processing component to program or configure one or more processing elements.

The UAV 10 is depicted by way of example, not limitation. Although much of the present disclosure is described with respect to unmanned aerial vehicle, it will be appreciated that embodiments of the disclosed technology may be used with any unmanned vehicle (UV), such as unmanned marine vehicles and unmanned ground vehicles. For example, the disclosed control systems may be used with unmanned boats, unmanned submarines, unmanned cars, unmanned trucks, or any other unmanned vehicle capable of locomotion.

Figure 2:
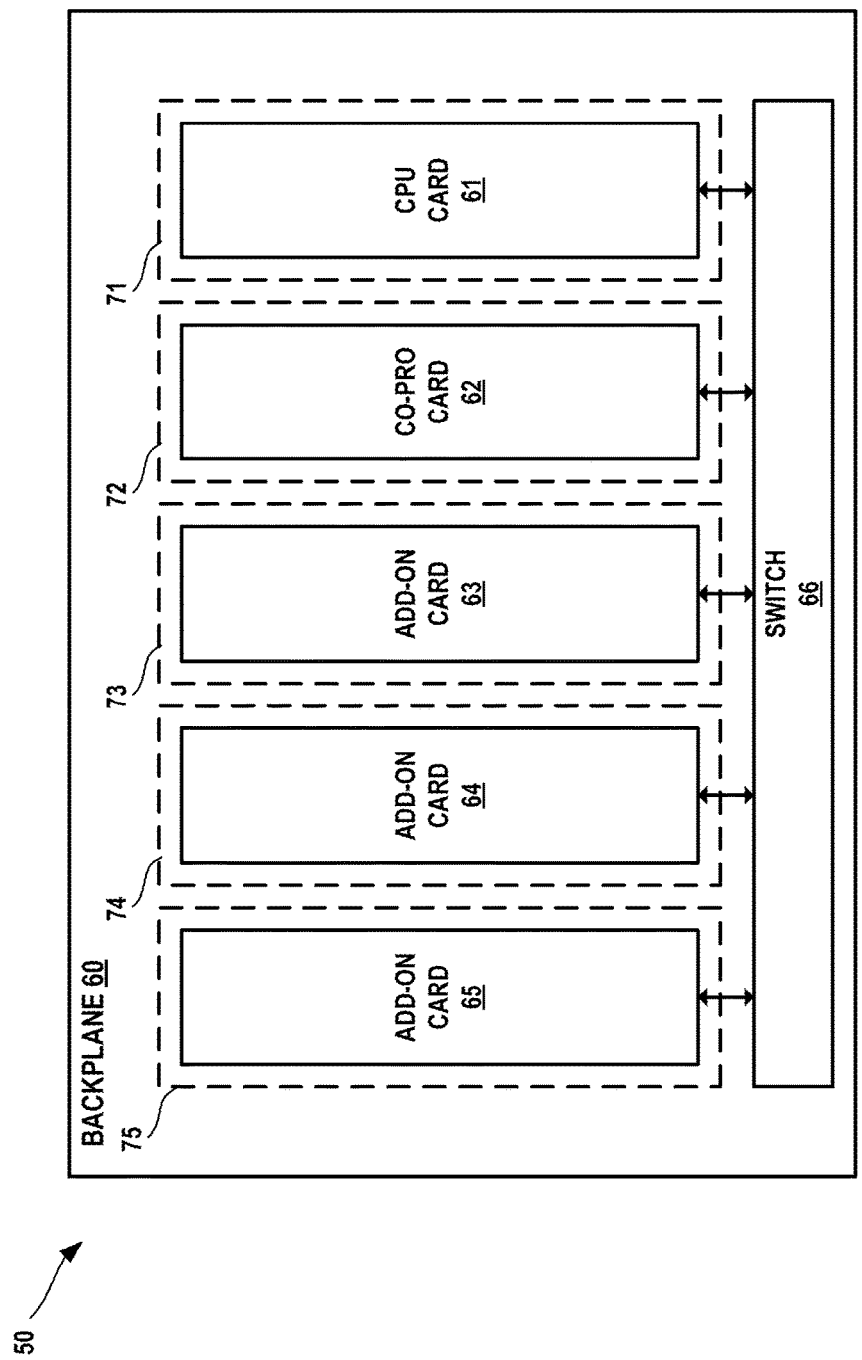
FIG. 2 is a block diagram depicting an example of a typical control system for a UAV including a backplane and card architecture.

FIG. 2 is a block diagram depicting an example of a typical control system 50 for a UAV. In this example, a control system is formed using a backplane 60 having a plurality of card slots 71, 72, 73, 74, 75. Each card slot is configured to receive a card meeting a predefined set of mechanical and electrical standards. Each card includes one or more circuit boards, typically including one or more integrated circuits configured to perform specific vehicle or mission control functions. The card slot provides structural support for the card, as well as an electrical connection between the card and an underlying bus. A particular example is depicted having a CPU card 61 installed in a first card slot 71, a co-processor card 62 installed in a second card slot 72, and add-on cards 63, 64, 65 installed in card slots 73, 74, 75, respectively. By way of example, CPU card 61 may include a circuit board having a processor, PCI circuitry, switching circuitry, and an electrical connector configured to both structurally and electrically connect card 61 to card slot 71. Similarly, co-processor card 62 may include a processor, PCI circuitry, switching circuitry, and a connector.

Add-on cards 63, 64, 65 may include any number and type of cards configured to perform one or more vehicle and/or mission functions. Examples of add-on cards include input/output (I/O) cards, network cards, piloting and navigation function cards, sensor interface cards (e.g., cameras, radar, etc.), payload systems control cards, graphics processing unit (GPU) cards, and any other card for a particular type of vehicle and/or mission function.

Typical backplane architectures like that in FIG. 2 include a switch 66 that allows each card to communicate with cards in any other slot. Numerous examples including various standards exist to define different types of backplane architectures. For example, although switch 66 is shown separate from the card slots 71, 72, 73, 74, 75, some architectures may place a central switch in a particular slot of the backplane. In each case, the node devices can communicate with one another via the switch. While five card slots are depicted in FIG. 2, a backplane may include any number of card slots.

An onboard control system for a UAV utilizing a backplane architecture like that of FIG. 2 may be effective in providing some function control. Additionally, such an architecture may provide some configurability through hardware changes. However, traditional backplane architectures may have a number of drawbacks in implementations for UAVs. For example, the structural performance of a backplane coupling to a plurality of cards through a combined electrical and mechanical connection may not be well-suited to the high-stress environments of some UAVs. Mechanical and/or electrical failures may occur for one or more cards in the backplane due to vibrations, temperatures, and other factors. Additionally, such architectures provide a limited processing capability, while requiring considerable space and weight. Each card typically includes its own circuit board including connectors, switching circuitry, communication circuitry, etc. Because each circuit board requires its own circuitry for these common functions, a backplane architecture may provide relatively high weight and space requirements. Moreover, the computing ability and capacity of these types of systems is typically limited by a multiple card approach. Communication between the cards, and between the various processing elements may lead to reduced computational abilities.

Figure 3:
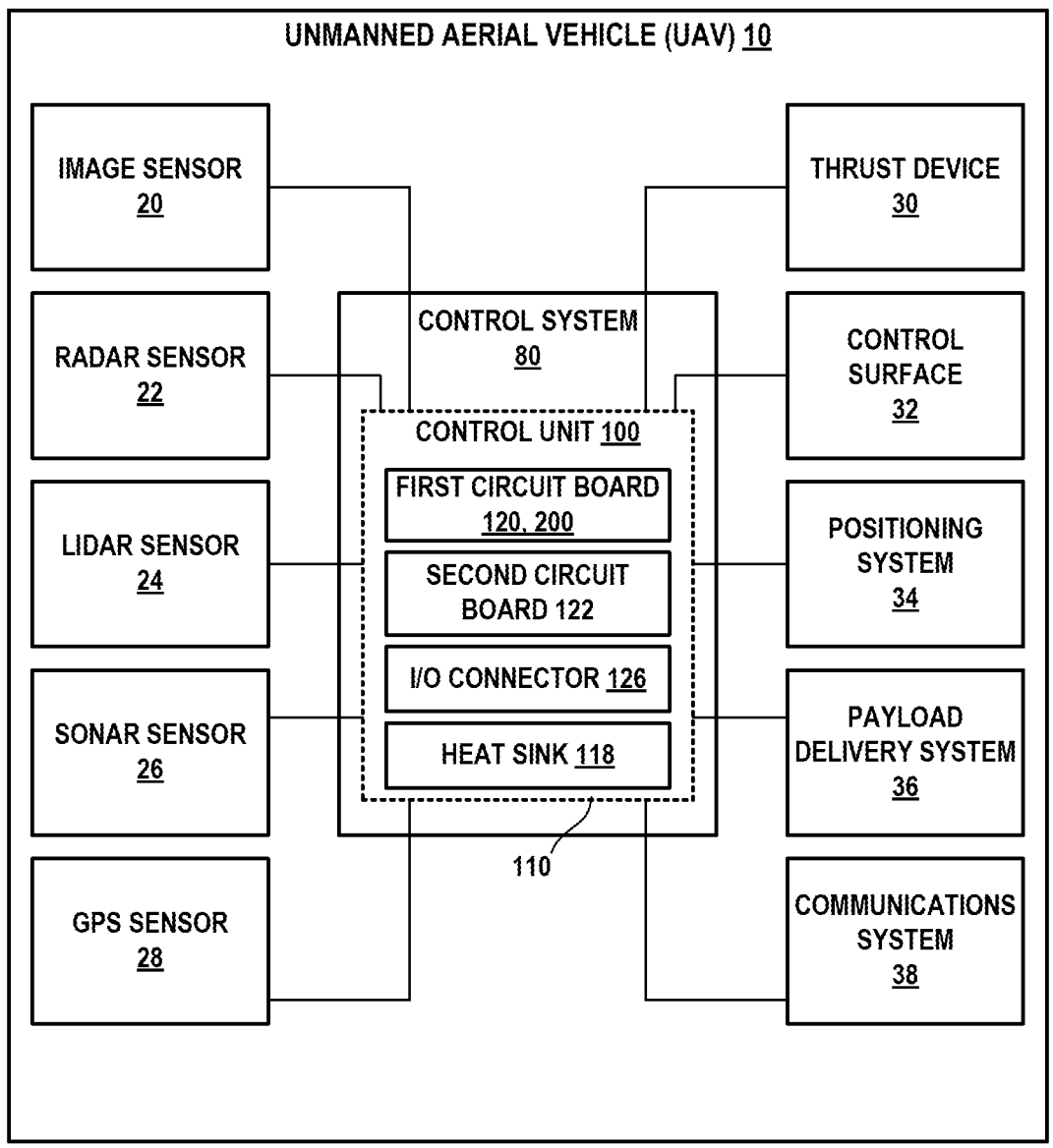
FIG. 3 is a block diagram depicting an example of a UAV having an onboard control system according to example embodiments of the present disclosure.

FIG. 3 is a block diagram depicting an unmanned aerial vehicle (UAV) 10 including a control system 80 in accordance with embodiments of the disclosed technology. Control system 80 includes a control box 100 that provides centralized control of vehicle and mission functions. The control box includes a housing 110 defining an interior. A first circuit board 120 and second circuit board 122 are disposed within the interior of housing 110, and an I/O connector 126 extends from the second circuit board 122 through the housing 110 as described hereinafter. Control box 100 includes a heat sink 118 provided to dissipate heat from the electric components of the control box 100. In example embodiments, heat sink 118 may form at least a portion of housing 110 as described hereinafter. Control system 80 may include additional components such as additional control units or other elements that perform vehicle or mission control processes.

In some implementations, first circuit board 120 comprises a control module for controlling vehicle and mission control processes of UAV 103, and second circuit board 122 comprises a carrier module for providing a communication interface between the control unit and various PM devices and secondary devices of the UAV.

In some examples, the first circuit board 120 includes multiple heterogeneous processing systems, each having a reconfigurable processing architecture to provide management of the various vehicle and mission functions. The multiple heterogeneous processing systems with reconfigurable functionality are suited to the diverse functions performed by unmanned airborne vehicles, as well as the high level of certifications typically needed for these vehicles.

In example embodiments, the second circuit board 122 is a carrier module providing an interface between the first circuit board 120 and the various PM devices and secondary devices of UAV 10. For example, FIG. 3 depicts a set of PM devices including a thrust device 30, control surface 32, and positioning system 34. Additionally, FIG. 3 depicts a set of secondary devices including an image sensor 20, a radar sensor 22, a LIDAR sensor 24, a sonar sensor 26, a GPS sensors 28, a payload delivery system 36, and a communication system 38. The second circuit board 122 may include an I/O connector that connects to a corresponding I/O connector of the first circuit board, as well as an I/O connector that extends from the housing. Additionally, the second circuit board may include a plurality of sensor connectors that extend from the housing. The second circuit board may provide a communications or input/output (I/O) interface including associated electronic circuitry that is used to send and receive data. More specifically, the communications interface can be used to send and receive data between any of the various integrated circuits of the second circuit board, and between the second circuit board and other circuit boards. For example, the item interface may include I/O connector 126, I/O connector 238, and/or I/O connector 124. Similarly, a communications interface at any one of the interface circuits may be used to communicate with outside components such as another aerial vehicle, a sensor, other vehicle devices, and/or ground control. A communications interface may be any combination of suitable wired or wireless communications interfaces.

In some examples, control box 100 may include additional components. For example, a third circuit board such as a mezzanine card can be provided within control box 100 in another embodiment. The third circuit board may include one or more nonvolatile memory arrays in some examples. For example, a solid-state drive (SSD) may be provided as one or more integrated circuits on a mezzanine card. Moreover, the control box 100 may include additional circuit boards to form a control module as well as additional circuit boards to form additional carrier modules.

Figure 4:
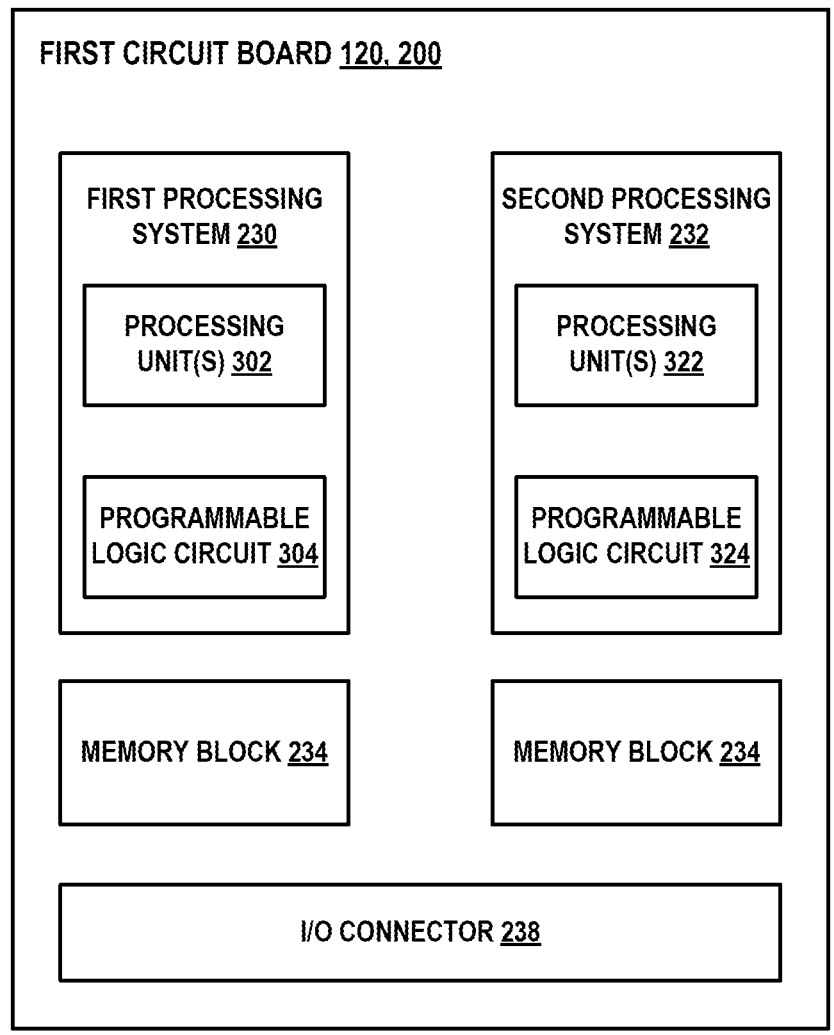
FIG. 4 is a block diagram depicting a first circuit board comprising a control module for a control unit of the onboard control system according to example embodiments of the present disclosure.

FIG. 4 is a block diagram describing a first circuit board 120 in accordance with example embodiments of the disclosed technology. In FIG. 4, first circuit board 120 is configured as a control module (e.g., control board) for an unmanned aerial vehicle (UAV). In example embodiments, first circuit board 120 is a system-on-module (SOM) card. First circuit board 120 includes a first processing system 230, second processing system 232, memory blocks 234, and an I/O connector 238.

The first and second processing systems can include or be associated with, any suitable number of individual microprocessors, power supplies, storage devices, interfaces, and other standard components. The processing systems can include or cooperate with any number of software programs (e.g., vehicle and mission control processes) or instructions designed to carry out the various methods, process tasks, calculations, and control/display functions necessary for operation of the aerial vehicle 10. Memory blocks 234 may include any suitable form of memory such as, without limitation, SDRAM, configured to support a corresponding processing system. For example, a first memory block 234 may be configured to support first processing system 230 and a second memory block 234 may be configured to support second processing system 232. Any number and type of memory block 234 may be used. By way of example, four memory blocks each comprising an individual integrated circuit may be provided to support the first processing system 230 and two memory blocks may be provided to support the second processing system 232.

I/O connector 238 extends from a first surface of first circuit board 122 to provide an operative communication link to second circuit board 122.

First processing system 230 and second processing system 232 form a heterogeneous and reconfigurable computing architecture in example embodiments of the disclosed technology, suitable to the diverse and stable needs of UAV 10. First processing system 230 includes one or more processing units 302 forming a first processing platform and one or more programmable logic circuits 304 forming a second processing platform. By way of example, one or more processing units 302 may include a central processing unit and programmable logic circuit 304 may include a volatile programmable logic array such as a RAM-based field programmable gate array (FPGA). Any number and type of processing unit may be used for processing units 302. Multiple processing units 302 and programmable logic circuit 304 may be provided within a first integrated circuit, referred to generally as a processing circuit in some embodiments.

Second processing system 232 includes one or more processing units 322 forming a third processing platform and one or more programmable logic circuits 324 forming a fourth processing platform. By way of example, one or more processing units 302 may include a co-processing unit and programmable logic circuit 324 may include a flash-based FPGA. Any number and type of processing unit may be used for processing units 324. One or more processing units 324 and programmable logic circuit 324 may be provided within the second integrated circuit, also referred to as a processing circuit in some embodiments.

Figure 5:
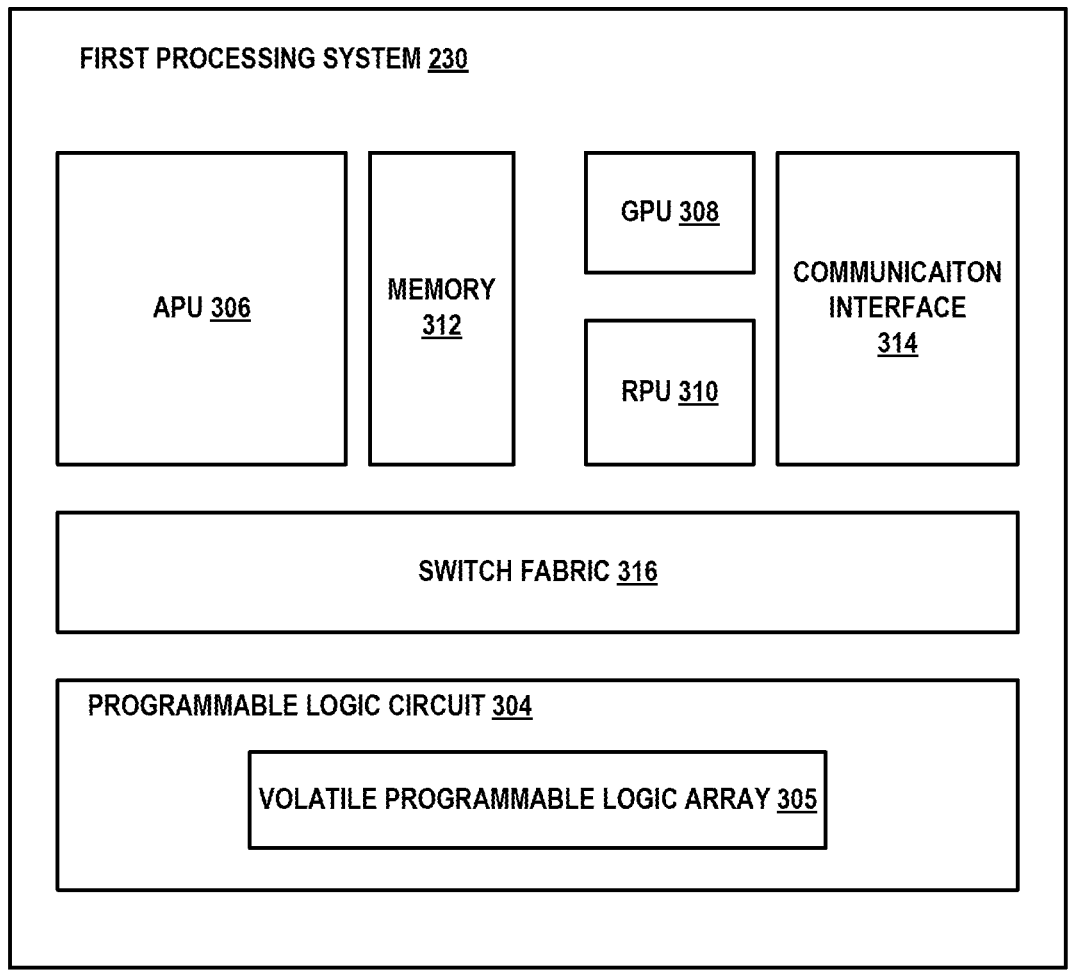
FIG. 5 is a block diagram depicting a first processing system of the first circuit board according to example embodiments of the present disclosure.

By providing different processing unit types as well as different programmable logic circuit types in each processing system, first circuit board 120 provides a heterogeneous computing system uniquely suited to the processing and operational requirements of high-stress application UAVs. For example, the RAM-based and flash-based FPGA technologies are combined to leverage the strengths of both for UAV applications. The unique abilities of heterogeneous processing units 302 and 322 and heterogeneous programmable logic circuits 304 and 324 support both hardware and software-partitioned operating environments. Vehicle and mission control processes can be allocated to different partitions according to criticality and performance needs. This provides a control and monitor architecture suitable for critical operations. For example, an on/off or red/green architecture for control of irreversible critical functions is provided. By way of further example, one or more of the field programmable gate arrays may be configured to provide a fabric accelerator for onboard sensor processing FIG. 5 is a block diagram describing additional details of first processing system 230 in accordance with example embodiments of the disclosed technology. In FIG. 5, first processing system 230 includes three processing units 302 as described in FIG. 4. More particularly, first processing system 230 includes an application processing unit (APU) 306, a graphics processing unit (GPU) 308, and a real-time processing unit (RPU) 310. Each of processing units 306, 308, 310 may be supported by memory 312 which may include any number and type of memory such as SDRAM. Each processing unit is implemented on an individual integrated circuit referred to as a processing circuit. In one example, APU 306 is formed on a first processing circuit and includes a quad core processing unit comprising four processors. RPU 310 is formed on a third processing circuit and includes a dual core processing unit comprising two processors. GPU 308 is formed on a third processing circuit and includes a single core processing unit. A fourth processing unit is provided for the second processing system as described below. A switch fabric 316 connects the various components of processing system 230. Switch fabric 316, for example, may include a low-power switch and a central switch in some examples. Communication interface 314 couples first processing system 232 to first circuit board 120.

Programmable logic circuit 304 includes a volatile programmable logic array 305. In example embodiments, logic array may include a RAM-based programmable logic array 305 such as a RAM-based floating point gate array including RAM logic blocks or memory cells. Volatile programmable logic array 305 can be programmed with configuration data provided to the first processing system through communication interface 314. For example, a RAM-based FPGA can store configuration data in the static memory of the array, such as in an organization comprising an array of latches. The logic blocks are programmed (configured) when programmable logic circuit 304 is started or powered up. The configuration data can be provided to logic array 305 from an external memory (e.g., nonvolatile memory of first circuit board 120 or a mezzanine board as described hereinafter) or from an external source of UAV 10 (e.g., using second circuit board 122). A RAM-based FPGA provides high levels of configurability and re-configurability. Although not shown, logic array 305 may include various programmed circuits such as ethernet interfaces and PCI interfaces, and the various vehicle and mission control processes described herein.

Figure 6:
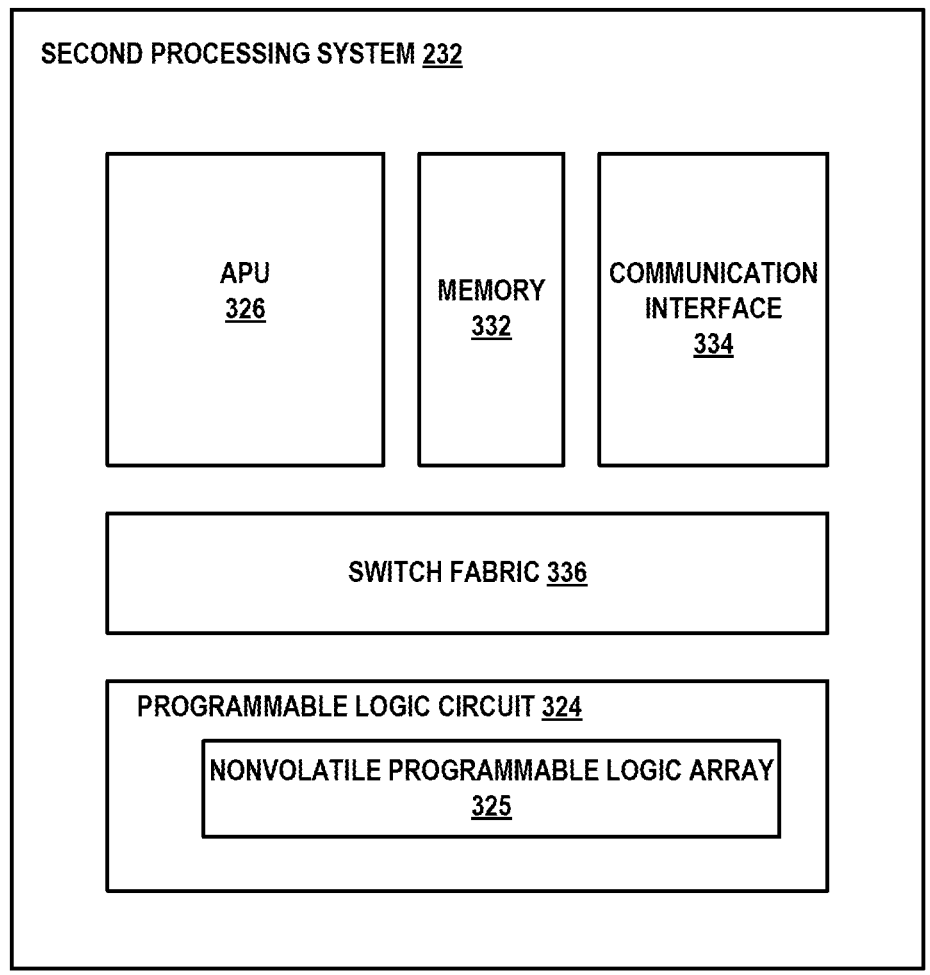
FIG. 6 is a block diagram depicting a second processing system of the first circuit board according to example embodiments of the present disclosure.

FIG. 6 is a block diagram describing additional details of second processing system 232 accordance with example embodiments of the disclosed technology. In FIG. 6, second processing system 232 includes an application processing unit (APU) 326 and memory 332. In one example, APU 326 is formed on a second processing circuit and includes a quad core processing unit comprising four processors. Memory 332 may include any number and type of memory such as SDRAM. A switch fabric 336 connects the various components of processing system 232. Communications interface 334 couples first processing system 232 to first circuit board 120.

Programmable logic circuit 324 includes a non-volatile programmable logic array 325. In example embodiments, logic array 325 may include a flash-based programmable logic array 325 such as a flash-based floating point gate array including flash logic blocks or memory cells. Non-volatile programmable logic array 325 can be programmed with configuration data provided to the second processing system through communication interface 334. For example, a flash-based FPGA can store configuration data in the nonvolatile memory of the array. Flash memory is used as the primary resource for storage of the configuration data such that RAM-based memory is not required. Because the configuration data is stored within the nonvolatile memory, there is no requirement for reading the configuration data to the logic array upon startup or power up. As such, the flash-based logic array may execute applications immediately upon power up. Moreover, external storage of configuration data is not required. The flash-based logic array can be reprogrammed or reconfigured by providing updated configuration data to override the configuration data presently stored in the logic array. The flash-based logic array may consume less power than the RAM-based logic array, as well as provide more protection against interference. Although not shown, logic array 325 may include various programmed circuits, such as for the various vehicle and mission control processes described herein. In one example, logic array 325 may include at least one FPGA fabric accelerator for onboard sensor processing.

Figure 7:
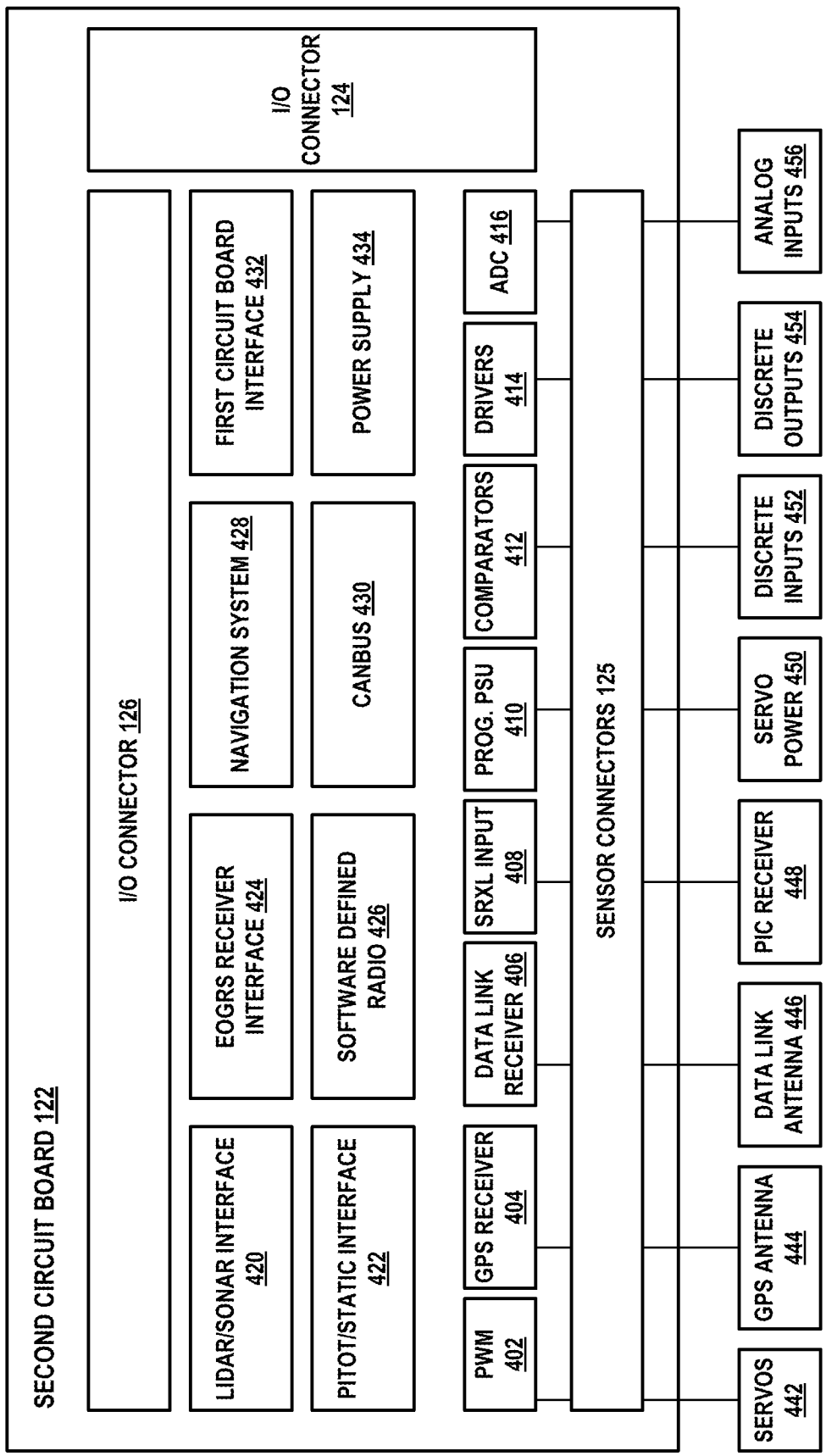
FIG. 7 is a block diagram depicting a second circuit board comprising a carrier module for the control unit according to example embodiments of the present disclosure.

FIG. 7 is a block diagram depicting additional details of second circuit board 122 in accordance with example embodiments of the disclosed technology. In FIG. 7, second circuit board 122 is configured as a carrier module (e.g., carrier card) for an unmanned aerial vehicle (UAV). Second circuit board 122 includes a plurality of integrated circuits such as interface circuits providing I/O capabilities for control box 100. The interface circuits are configured to receive outputs of the plurality of vehicle devices of the UAV via the sensor connectors. The interface circuits provide vehicle device data based on outputs of the vehicle devices to the first circuit board via I/O connector 124. Second circuit board 122 includes an I/O connector 126 that extends from a housing of control unit 100 to provide an operative communication link to PM devices and secondary devices of UAV 10. Additionally, second circuit board 122 includes an I/O connector 124 extending from a first surface of second circuit board 122 to provide an operative communication link to first circuit board 120. Although not shown, second circuit board 122 may include an additional I/O connector for coupling to a mezzanine card including a solid-state drive, for example. Any one or a combination of I/O connectors 126, 124, and 228 may form an I/O interface between the interface circuits of the second circuit board and the first and second processing systems of the first circuit board.

FIG. 7 describes a particular set of interface circuits as may be used in the particular implementation of control box 100. It will be appreciated, however, that any number and type of interface circuit may be used as suited for a particular implementation. Second circuit board 122 includes a plurality of interface circuits such as a LIDAR/SONAR interface 420, a Pitot/static interface 422, an electro-optical grid reference system (EOGRS) receiver interface 424, and a first circuit board interface 432 for communicating with first circuit board 122. Second circuit board 122 also includes interface circuits such as a software defined radio 426, a navigation system 125, a controller area network bus (CAN-BUS) 430, and a power supply 434. In some embodiments, navigation system 428 is an integrated circuit providing an integrated navigation sensor suite, including various sensors such as inertial measurement sensors. Additionally, second circuit board 122 includes a number of interface circuits in operative communication with a plurality of vehicle devices (e.g., PM devices or secondary devices) of the UAV 10. A plurality of sensor connectors 458 extend from the housing of control unit 100 for coupling to the vehicle devices of UAV 10.

In the specific example of FIG. 7, one or more pulse width modulators (PWM) 402 are in operative communication with one or more servos 442 via a first sensor connector 458. Although a PWM servo command interface is depicted, other types of servo command interfaces may be used. For example, analog voltage, current loop, RS-422, RS-485, MIL-STD-1553 are all examples of possible servo control signals. A GPS receiver 404 is in operative communication with one or more GPS antennas for 444 via a second sensor connector 458. GPS antennas 444 are one example of a GPS sensor 28. A datalink receiver 406 is in operative communication with one or more datalink antennas 446 via a third sensor connector 458. A serial receiver link (SRXL) input 408 is in operative communication with a pilot in control (PIC) receiver 448 via a fourth sensor connector 458. A programmable power supply unit (PSU) 410 is in operative communication with a servo power 450 via a fifth sensor connector 458. One or more comparators 412 are in operative communication with one or more discrete inputs 452 via a sixth sensor connector 458. One or more drivers 414 are in operative communication with one or more discrete outputs 454 via a seventh sensor connector 458. One or more analog-to-digital converters (ADC) 416 are in operative communication with one or more analog inputs 456 via an eighth sensor connector 458.

Figure 8:
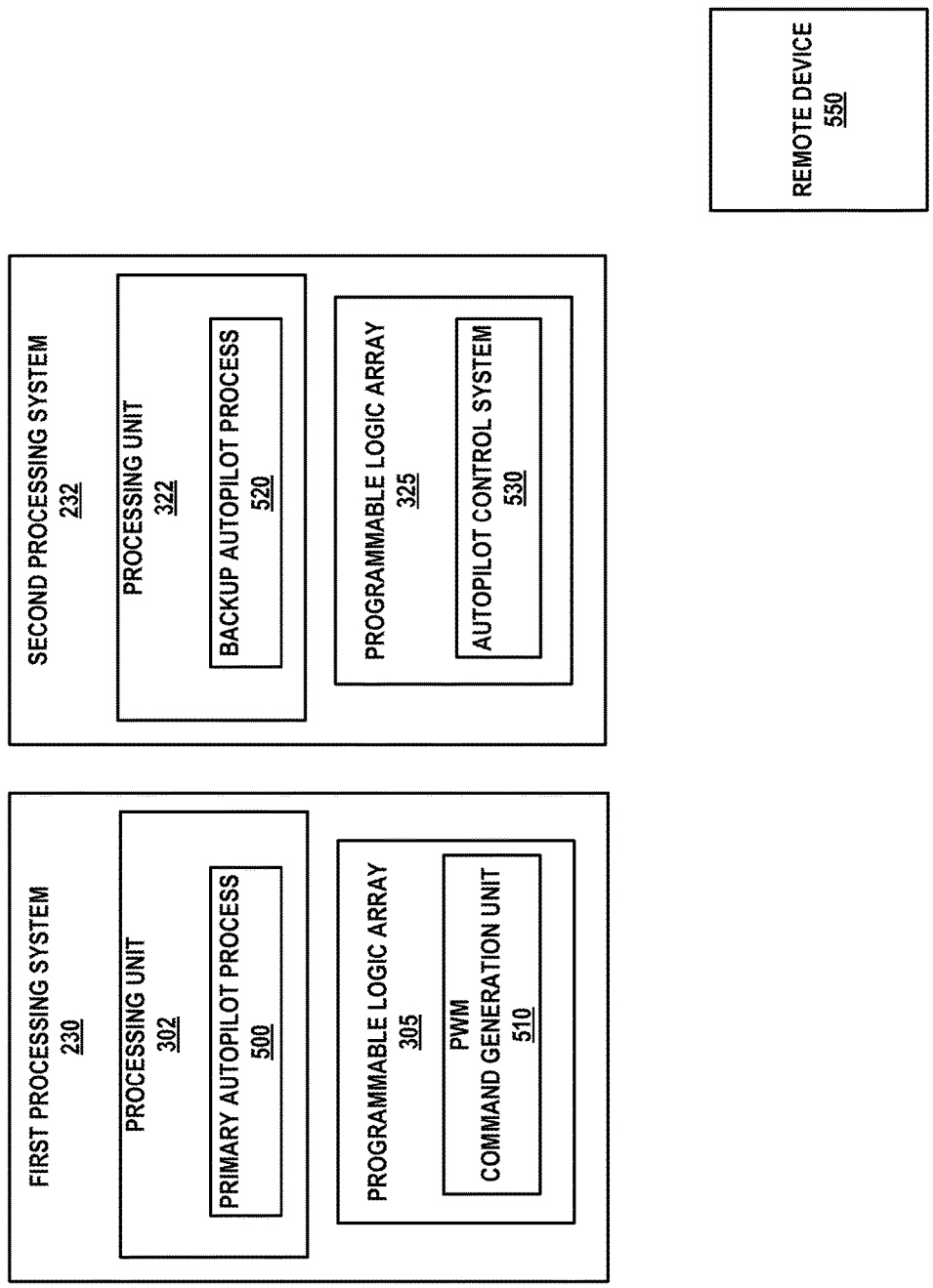
FIG. 8 is a block diagram depicting a control system for an unmanned aerial vehicle according to example embodiments of the present disclosure.

FIG. 8 is a block diagram depicting an example of first circuit board 120 (FIG. 5) in accordance with embodiments of the disclosed technology. FIG. 8 depicts a specific implementation of first circuit board 120. FIG. 8 depicts first processing system 230 second processing system 232 as previously described. For clarity of description, only a subset of the components of processing systems 230 and 232 are depicted. A simplified version of first processing system 230 is depicted including processing unit 302 and volatile programmable logic array 305. Second processing system 232 is depicted with processing units 322 and programmable logic array 305.

Figure 9:
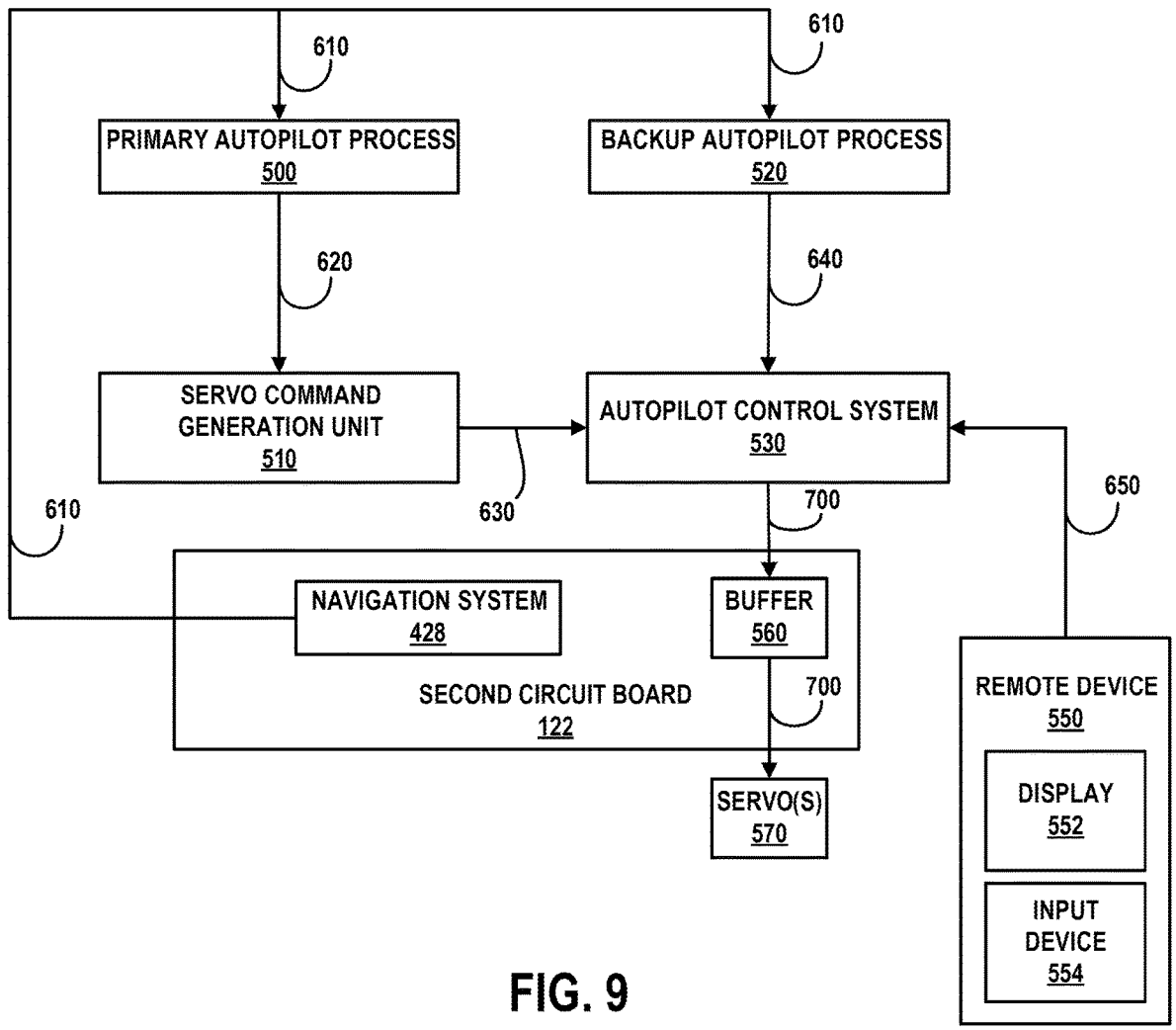
FIG. 9 is a block diagram depicting a portion of the control system according to example embodiments of the present disclosure.

Referring now to FIGS. 8 and 9 in combination, the first processing system 230 is configured to execute a primary autopilot process 500 that guides the UAV without assistance from a human operator (e.g., pilot). By way of example, the primary autopilot process may be executed based on a first set of processor readable instructions stored in memory 312 (FIG. 5) and executed by the RPU 310 (FIG. 5). As shown, the primary autopilot process 500 receives sensor data 610 from the navigation system 428 and generates an output 620 that may be provided to the volatile programmable logic array 305 of the first processing system 230. As shown, the volatile programmable logic array 305 may be configured to include a servo command generation unit 510 that receives the output 620 of the primary autopilot process 500 and generate one or more first servo commands 630. In example embodiments, the one or more first servo commands 630 generated by the servo command generation unit 510 may be PWM servo commands. However, it should be appreciated that the servo command generation unit 510 may be configured to generate the one or more first servo commands 630 via any suitable method.

The second processing system 232 may be configured to execute a backup autopilot process 520 that guides the UAV without assistance from the human operator. By way of example, the backup autopilot 520 may be executed based on a second set of processor readable instructions stored in memory 332 (FIG. 6) and executed by APU 326 (FIG. 6). In example embodiments, the second set of processor readable instructions may be different than the first set of processor readable instructions executed by the RPU 326 (FIG. 5) to implement the primary autopilot process 500. More specifically, the first set of processor readable instructions may include one or more functions that are not included in the second set of processor readable instructions. In this manner, the backup autopilot process 520 may be a simplified version of the primary autopilot process 500.

As shown, the backup autopilot process 520 receives sensor data 610 from the navigation system 428 and generates an output 640 that may be provided to the non-volatile programmable logic array 325 of the second processing system 230. As shown, the non-volatile programmable logic array 325 may be configured to include an autopilot control system 530. In example embodiments, the autopilot control system 530 receives the one or more servo commands 630 generated by the servo command generation unit 510. The autopilot control system 530 may also receive the output 640 generated by the backup autopilot process 520.

In example embodiments, the autopilot control system 530 may also receive an output 650 of a remote device 550. More specifically, the remote device 550 may be communicatively coupled to the second processing system 232 via the second circuit board 122. In some examples, the remote device 550 includes a display 552 and one or more user input devices 554 (e.g., joystick). As such, the output 650 may be generated in response to a human operator (e.g., ground pilot) manipulating one or more input devices 554. For instance, the one or more user input devices 554 may include a switch movable between a first position and a second position to enable and disable control of the UAV according to the primary autopilot process 500. As an example, when the switch is in the first position, the output 650 may include a command to enable the primary autopilot process 500. Alternatively, when the switch is in the second position, the output 650 may include a command to disable the primary autopilot process 500. It should be appreciated that the primary autopilot process 500 may be disabled and enabled using any suitable technique. For instance, the primary autopilot process 500 may be disabled and enabled by selecting one or more icons provided on the display 552 of the remote device 500.

Figure 10:
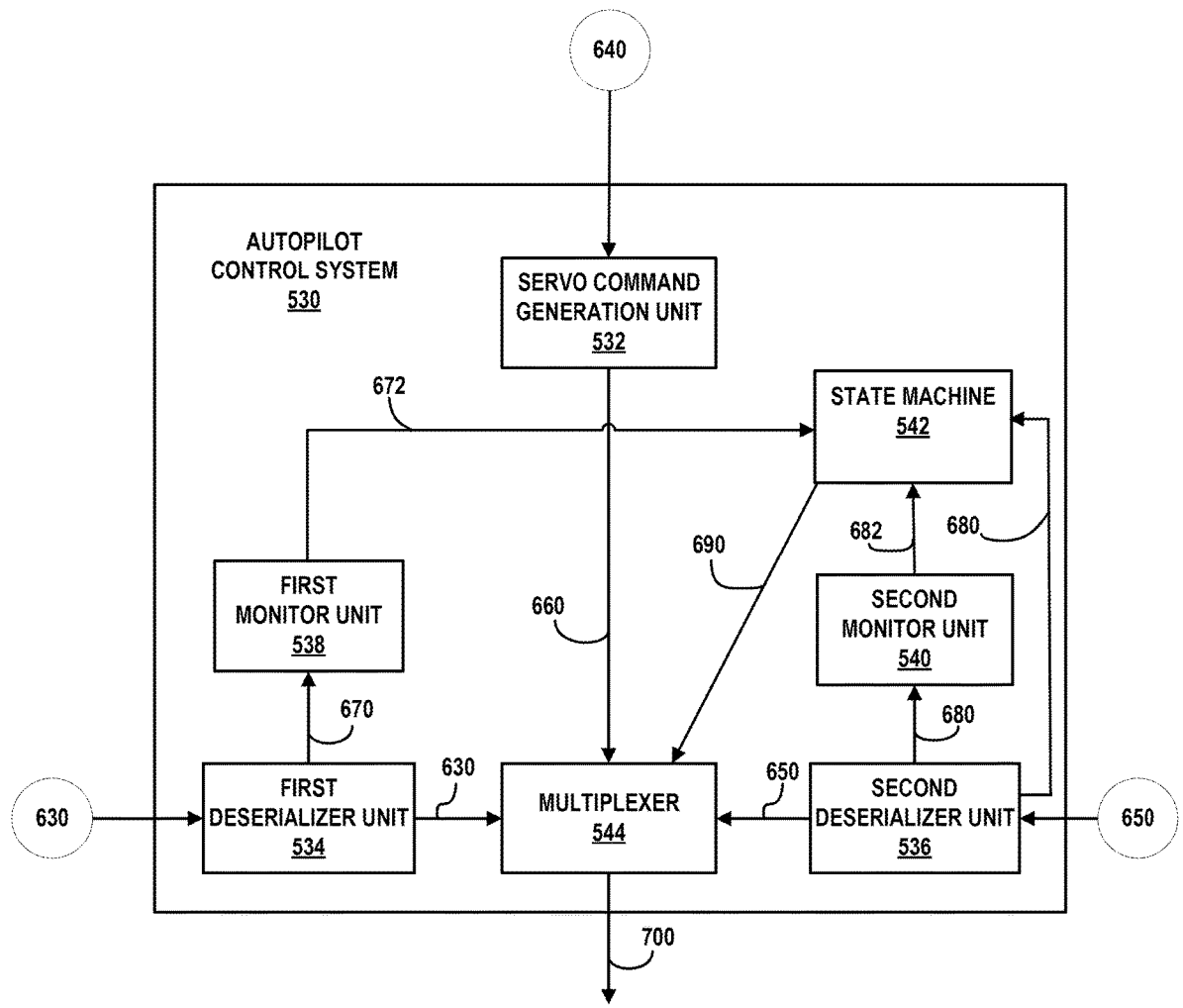
FIG. 10 is a block diagram depicting an example autopilot control system according to example embodiments of the present disclosure.

Referring now to FIG. 10, an example embodiment of the autopilot control system 530 is provided. As shown, the autopilot control system 530 includes a servo command generation unit 532 that receives the output 640 of the backup autopilot process 520 and generates one or more second servo commands 660. In example embodiments, the one or more second servo commands 660 generated by the servo command generation unit 532 may be PWM servo commands. However, it should be appreciated that the servo command generation unit 532 may be configured to generate the one or more second servo commands 660 via any suitable method.

In example embodiments, the autopilot control system 530 also includes a first deserializer 534 to reconstruct the one or more first servo commands 630 that are transmitted to the autopilot control system 530 over a serial communication link (not shown). The autopilot control system 530 may also include a second deserializer 536 to reconstruct the output 650 of the remote device 540. As such, the first deserializer 534 outputs the one or more first servo commands 630 and a first deserializer unit output signal 670 associated with the output 620 (FIG. 9) of the primary autopilot process 500 (FIGS. 8 and 9). Similarly, the second deserializer 536 outputs the output 650 of the remote device 540 and a second deserializer unit output signal 680 associated with the output 650 of the remote device 540.

In example embodiments, the first deserializer unit output signal 670 may indicate whether the output 620 is a valid output or an invalid output. More specifically, the invalid output may include a lack of the first deserializer unit output signal 670. In some examples, the lack of the first deserializer unit output signal 670 may indicate the first processing system 230 (FIG. 8) is compromised. Alternatively or additionally, the first deserializer unit output signal 670 or lack thereof may indicate the first processing system 230 (FIG. 8) is in a fault condition, has lost power, or encountered any other suitable type of fault condition.

Similarly, the second deserializer unit output signal 680 may indicate whether the output 650 is a valid output or an invalid output. In example embodiments, the output 650 of the remote device 550 may be considered invalid output when a signal loss event occurs in which the state machine 542 no longer receives the second deserializer unit output signal 680. The signal loss event may occur when a distance between the UAV and the remote device 550 exceeds a maximum distance at which the UAV may be controlled via the remote device 550.

In example embodiments, the second deserializer unit output signal 680 may indicate whether the human operator has enabled or disabled the primary autopilot process 500. More specifically, the human operator may manipulate the one or more input devices 554 to enable or disable the primary autopilot process 500. As an example, the one or more input devices 554 may include a switch movable between a first position and a second position. When the switch is in the first position, the primary autopilot process 500 may be enabled. Conversely, the primary autopilot process 500 may be disabled when the switch is in the second position.

In example embodiments, the autopilot control process 530 may include a first monitoring unit 538 and a second monitoring unit 540. As shown, the first monitoring unit 538 receives the first deserializer unit output signal 670. Similarly, the second monitoring unit 540 receives the second deserializer unit output signal 680. When the first monitoring unit 538 receives the first deserializer unit output signal 670, the first monitoring unit 538 may generate a first monitoring unit output signal 672 to indicate the first deserializer unit output signal 670 is valid. However, when the first monitoring unit 538 does not receive the first deserializer unit output signal 670, the first monitoring unit output signal 672 may indicate the output 620 associated with the primary autopilot process 500 is invalid. Similarly, when the second monitoring unit 540 receives the second deserializer unit output signal 680, the second monitoring unit 540 generates a second monitoring unit output signal 682 to indicate the output 650 of the remote device 550 is valid. In contrast, when the second monitoring unit 540 does not receive the second deserializer unit output signal 680, the second monitoring unit output signal 682 indicates the output 650 of the remote device 550 is invalid. It should be appreciated that the first and second monitoring units 538, 540 may be configured to monitor the first deserializer unit output signal 670 and the second deserializer unit output signal 680, respectively, for any other issues.

As shown, the autopilot control system 530 may include a state machine 542. In example embodiments, the state machine 542 may receive the a first signal and a second signal. As shown, the first signal may include the first monitoring unit output signal 672, and the second signal may include the second monitoring unit output signal 682. In alternative embodiments, the first signal may include the first deserializer unit output signal 670, and the second signal may include the second deserializer unit output signal 680. As will be discussed below, the state machine 542 may be configured to select the primary autopilot process 500, the remote device 550, or the backup autopilot process 520 to control the UAV 10 (FIG. 1).

In example embodiments, the state machine 542 generates an output 690 based on the first signal, the second signal, or both. As shown, the autopilot control system 530 includes a multiplexer 544 configured to receive the output 690 of the state machine 542. In addition, the multiplexer 544 may receive the one or more first servo commands 630 associated with the primary autopilot process 500, the one or more second servo commands 660 associated with the backup autopilot process 520, and the output 650 of the remote device 550. More specifically, the output 650 received by the multiplexer 544 may include one or more third servo commands. As will be discussed below in more detail, the output 690 generated by the state machine 542 determines an output 700 of the multiplexer 544.

When the second signal indicate a user-selection to control the UAV based on at least one autopilot input, the state machine 542 enables control of the UAV by the primary autopilot process 500 or the backup autopilot process 520. If the first deserializer output 670 indicates the output 610 of the primary autopilot process 510 is invalid (e.g., inconsistent or non-existent), then the state machine 542 enables control of the UAV by the backup autopilot process 520. As such, the output 690 of the state machine 542 may direct the multiplexer 544 to select the one or more second servo commands 660 as the output 700 of the multiplexer 544. However, if the first signal (e.g., first monitoring unit output signal 672) indicates the output 620 of the primary autopilot process 510 is valid (e.g., existent and consistent), then the state machine 542 enables control of the UAV by the primary autopilot process 500. As such, the output 690 of the state machine 542 may direct the multiplexer 544 to select the one or more first servo commands 630 as the output 700 of the multiplexer 544.

When the second signal (e.g., second deserializer unit output signal 680) does not indicate a user selection to control the UAV based on at least one autopilot input, the state machine enables control of the UAV by the remote device 550. As such, the output 690 of the state machine 542 may direct the multiplexer 544 to select the output 650 of the remote device 550 as the output 700 of the multiplexer 544. More specifically, the output 690 may direct the multiplexer 544 to select the one or more third servo commands associated with the output 650 of the remote device 650 as the output 700. However, if the state machine 542 stops receiving the second deserializer output 680, the state machine 542 will enable control of the UAV by backup autopilot process 520. As such, the state machine 542 will modify the output 690 provided to the multiplexer 544 so that the multiplexer 544 selects the one or more second servo commands 660 as the output 700.

It should be appreciated that the multiplexer 544 may be configured to receive data (e.g. servo commands) from additional input devices and/or processing systems as part of the autopilot control process. For example, the multiplexer 544 may receive data from more than two autopilot process or more than one remote device as shown in FIG. 10. Additional autopilot processes may be configured in the first or second processing systems, or in additional processing systems other than the first and second processing systems 230, 232 discussed above. Moreover, although the disclosure has been presented with respect to autopilot control processes, it will be appreciated that the disclosed technology may be applied to any suitable aircraft system and/or device. A multiplexer as described may be configured to receive data from any suitable aircraft system and an associated state machine configured to determine which data to provide as an output. For instance, a multiplexer as described may be configured to receive data from multiple aircraft navigation systems or processes and provide a particular output based on state machine control. Other examples may include communication systems or payload delivery systems where multiple processes generate an output which is selected by the state machine.

Referring again to FIGS. 8 and 9, the output 700 of the multiplexer 544 may be provided to one or more buffers 560 on the second circuit board 122. As shown, the buffer(s) 560 may provide the output 700 to one or more servo motors 570. In this manner, the flight path of UAV can be adjusted based, at least in part, on sensor data 610 obtained from the navigation system 428. In alternative embodiments, the output of the multiplexer 544 may be provided directly to the one or more servo motors 570.

Figure 11:
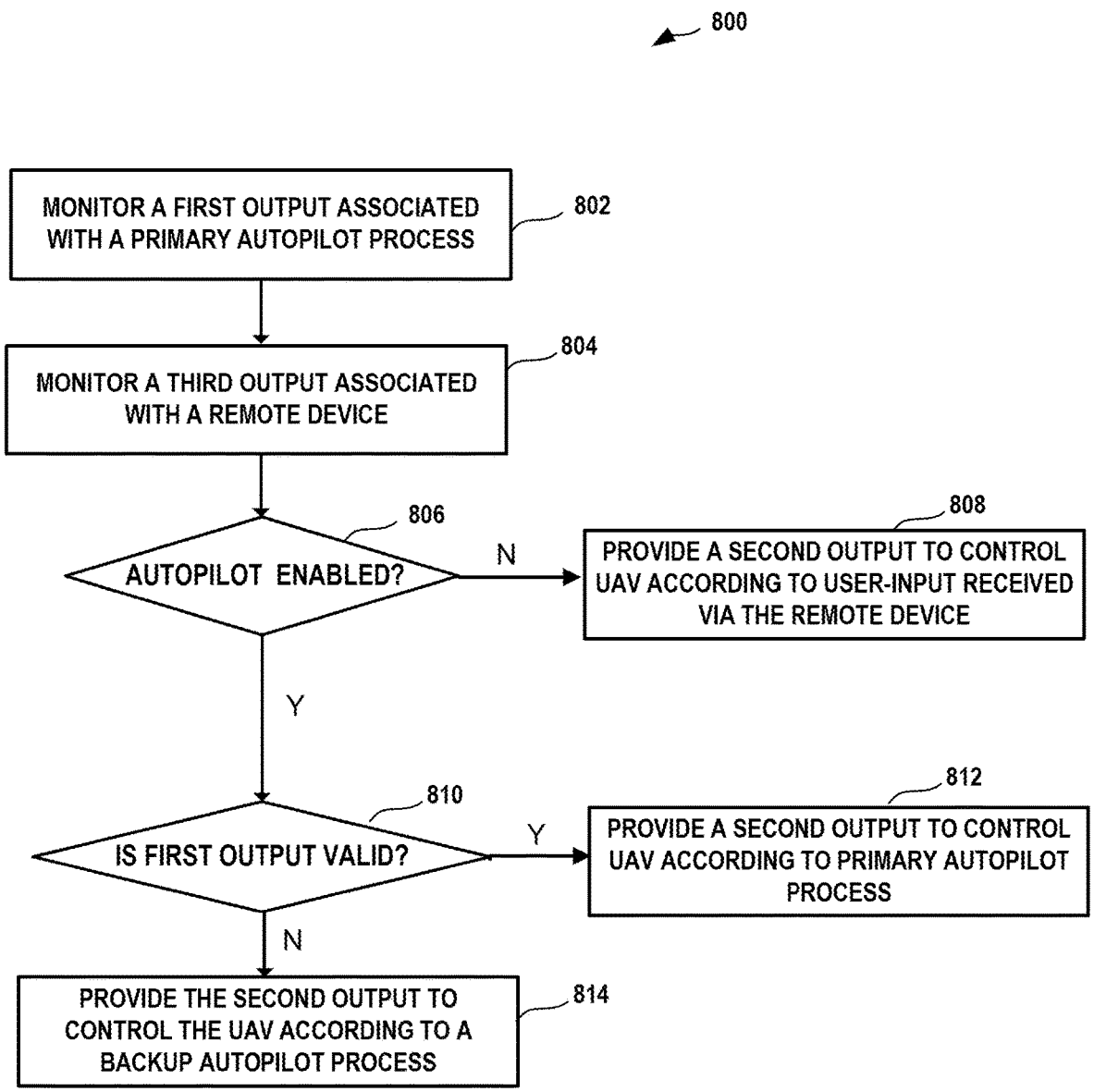
FIG. 11 is a flowchart depicting a method for controlling an unmanned aerial vehicle according to example embodiments of the present disclosure.

FIG. 11 depicts a flow diagram of an example method 800 for controlling an unmanned aerial vehicle according to example embodiments of the present disclosure. The method 800 may be implemented using, for instance, the first and second processing systems 230, 232 discussed above with reference to FIG. 8. FIG. 11 depicts steps performed in a particular order for purposes of illustration and discussion. Those of ordinary skill in the art, using the disclosures provided herein, will understand that various steps of the method 600 or any of the other methods disclosed herein may be adapted, modified, rearranged, performed simultaneously or modified in various ways without deviating from the scope of the present disclosure.

At (802), the method 800 comprises monitoring, by a state machine configured in a programmable logic array, a first output associated with a primary autopilot process executing in a first processing system. In example embodiments, the first output may include the first signal (e.g., first monitoring unit output signal 672) associated with the primary autopilot process.

At (804), the method 800 comprises monitoring, by the state machine, a third output associated with a remote device configured to control the UAV via user-manipulation of one or more inputs of the remote device. In some examples, the third output may include the output of the remote device discussed above with reference to FIGS. 8 and 9. More specifically, the third output may indicate whether the primary autopilot process 500 has been disabled or enabled.

At (806), the method 800 comprises determining whether the primary autopilot process is enabled. When the third output indicates the primary autopilot process has been disabled, the method 800 proceeds to (808). Otherwise, the method 800 proceeds to (810).

At (808), the method 800 includes providing, by the state machine, the second output to control the UAV according to user-input received via the remote device. For example, the human operator may manipulate one or more input devices of the remote device to fly the UAV.

At (810), the method 800 includes determining, by the state machine, whether the first output is valid. In example embodiments, determining the first output is valid may include detecting a signal loss associated with the output of the primary autopilot process. When the state machine determines the first output is valid output, the method 800 proceeds to 812. Otherwise, the method 800 proceeds to (814).

At (812), the method 800 includes providing, by the state machine, the second output to control the UAV according to the primary autopilot process. In example embodiments, the state machine may provide the second output to a multiplexer configured in the programmable logic array. More specifically, the second output may be the output of the state machine and may direct the multiplexer to select one or more first servo commands associated with the primary autopilot process as the output of the multiplexer. In this manner, the UAV may be controlled according to the primary autopilot process.

At (814), the method 800 comprises providing, by the state machine, the second output to control the UAV according to a backup autopilot process executing on a second processing system. In example embodiments, the state machine may provide the second output to the multiplexer. More specifically, the second output may direct the multiplexer to select one or more second commands associated with the backup autopilot process as the output of the multiplexer. In this manner, the UAV may be controlled according to the backup autopilot process.

Some embodiments of the disclosed technology may be implemented as hardware, software, or as a combination of hardware and software. The software may be stored as processor readable code and implemented in a processor, as processor readable code for programming a processor for example. In some implementations, one or more of the components can be implemented individually or in combination with one or more other components as a packaged functional hardware unit (e.g., one or more electrical circuits) designed for use with other units, a portion of program code (e.g., software or firmware) executable by a processor that usually performs a particular function of related functions, or a self-contained hardware or software component that interfaces with a larger system, for example. Each hardware unit, for example, may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, these components may include software stored in a processor readable device (e.g., memory) to program a processor to perform the functions described herein, including various mission and vehicle control processes.

Processing units can include any number and type of processor, such as a microprocessor, microcontroller, or other suitable processing device. Memory device(s) can include one or more computer-readable media, including, but not limited to, non-transitory computer-readable media, RAM, ROM, hard drives, flash drives, or other memory devices.

Memory blocks and other memory described herein may can store information accessible by one or more processing units or logic array, including computer-readable instructions that can be executed by the one or more processor(s). The instructions can be any set of instructions that when executed by a processor, cause the processor to perform operations. The instructions can be software written in any suitable programming language or can be implemented in hardware. In some embodiments, the instructions can be executed by a processor to cause the processor to perform operations, such as the operations for controlling vehicle and/or mission functions, and/or any other operations or functions of a computing device.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system-on-module for controlling an unmanned aerial vehicle (UAV), comprising:
a first processing system including a first processing unit and a first programmable logic array, the first processing unit configured to execute a primary autopilot process for controlling the UAV, the first processing unit further configured to provide an output based on the primary autopilot process; and
a second processing system including a second processing unit and a second programmable logic array, the second programmable logic array configured to enable control of the UAV based on the primary autopilot process in response to a valid output of the first processing system, the second programmable logic array further configured to enable control of the UAV based on a backup autopilot process in response to an invalid output of the first processing system;
wherein the primary autopilot process includes a first set of processor readable instructions associated with controlling one or more vehicle devices of the unmanned vehicle; and wherein the backup autopilot process includes a second set of processor readable instructions that is different than the first set of processor readable instructions and is associated with controlling the one or more vehicle devices of the unmanned vehicle; and
wherein the second processing unit is configured to execute the backup autopilot process.

2. The system-on-module of claim 1, wherein the second programmable logic array is configured to detect the invalid output based on a signal loss associated with the output of the first processing unit.

3. The system-on-module of claim 1, wherein the second programmable logic array is further configured to:
receive an output of a remote device configured to selectively control the UAV; and
enable control of the UAV by the remote device in response to a valid output of the remote device.

4. The system-on-module of claim 1, wherein the second programmable logic array is further configured to enable control of the UAV based on the primary autopilot process in response to a valid output of the first processing system and the valid output of the remote device.

5. The system-on-module of claim 1, wherein:
the first programmable logic array comprises a RAM-based field programmable gate array; and
the second programmable logic array comprises a flash-based field programmable gate array.

6. A system-on-module for controlling an unmanned aerial vehicle (UAV), comprising:
a first processing system including a first processing unit and a first programmable logic array, the first processing unit configured to execute a primary autopilot process for controlling the UAV, the first processing unit further configured to provide an output based on the primary autopilot process; and
a second processing system including a second processing unit and a second programmable logic array, the second programmable logic array configured to enable control of the UAV based on the primary autopilot process in response to a valid output of the first processing system, the second programmable logic array further configured to enable control of the UAV based on a backup autopilot process in response to an invalid output of the first processing system;
wherein the primary autopilot process includes a first set of processor readable instructions associated with controlling one or more vehicle devices of the unmanned vehicle; and wherein the backup autopilot process includes a second set of processor readable instructions that is different than the first set of processor readable instructions and is associated with controlling the one or more vehicle devices of the unmanned vehicle.

7. The system-on-module of claim 6, wherein the second programmable logic array is configured to detect the invalid output based on a signal loss associated with the output of the first processing unit.

8. The system-on-module of claim 6, wherein the second programmable logic array is further configured to:
  receive an output of a remote device configured to selectively control the UAV; and
  enable control of the UAV by the remote device in response to a valid output of the remote device.

9. The system-on-module of claim 6, wherein the second programmable logic array is further configured to enable control of the UAV based on the primary autopilot process in response to a valid output of the first processing system and the valid output of the remote device.

10. The system-on-module of claim 6, wherein:
  the first programmable logic array comprises a RAM-based field programmable gate array; and
  the second programmable logic array comprises a flash-based field programmable gate array.

\* \* \* \* \*